United States Patent
Nehrig (10) Patent No.: US 7,356,423 B2
(45) Date of Patent: Apr. 8, 2008

(54) APPARATUS AND METHOD FOR READING OUT A DIFFERENTIAL CAPACITY WITH A FIRST AND SECOND PARTIAL CAPACITY

(75) Inventor: Oliver Nehrig, Moers (DE)

(73) Assignee: Fraunhofer-Gesellschaft zur Foerderderung der angewandten Forschung e.V, Munich (DE)

( * ) Notice: Subject to any disclaimer, the term of this patent is extended or adjusted under 35 U.S.C. 154(b) by 662 days.

(21) Appl. No.: 10/497,929

(22) Filed: Jun. 4, 2004

(65) Prior Publication Data

US 2005/0071114 A1 Mar. 31, 2005

Related U.S. Application Data

(63) Continuation of application No. PCT/EP02/01857, filed on Feb. 21, 2002.

(51) Int. Cl.
*G01R 23/00* (2006.01)
(52) U.S. Cl. .......................... 702/75; 331/47
(58) Field of Classification Search ............. 702/47, 702/52, 57, 64, 65, 69, 72, 74, 75, 67, 82, 702/89, 91, 98, 104, 106, 141, 176, 182, 702/193, 9; 331/11, 23, 47–49; 332/127; 73/724, 304 C; 342/203
See application file for complete search history.

(56) References Cited

U.S. PATENT DOCUMENTS

| | | | | |
|---|---|---|---|---|
| 4,503,402 A | * | 3/1985 | Englund, Jr. | ................ 332/127 |
| 4,797,603 A | * | 1/1989 | Choisnet | ..................... 324/678 |
| 4,860,232 A | | 8/1989 | Lee et al. | .................... 702/104 |
| 5,005,018 A | * | 4/1991 | Walters | ....................... 342/203 |
| 5,005,409 A | * | 4/1991 | Hochstein | ................. 73/304 C |
| 5,181,423 A | * | 1/1993 | Philipps et al. | ............... 73/724 |
| 5,466,303 A | * | 11/1995 | Yamaguchi et al. | .......... 148/33 |
| 5,856,762 A | * | 1/1999 | Werker et al. | ................ 331/11 |
| 5,905,759 A | * | 5/1999 | Ishida et al. | ................ 375/282 |
| 5,973,538 A | | 10/1999 | Shou et al. | .................. 327/344 |
| 6,011,970 A | * | 1/2000 | McCarthy | .................... 455/436 |
| 2002/0163389 A1 | * | 11/2002 | Jun | ............................ 331/1 A |

FOREIGN PATENT DOCUMENTS

DE 196 45 028 10/1996

\* cited by examiner

*Primary Examiner*—Marc S. Hoff
*Assistant Examiner*—Mohamed Charioui
(74) *Attorney, Agent, or Firm*—Michael A. Glenn; Glenn Patent Group (57) ABSTRACT

An apparatus for reading out a differential capacity with a first and second partial capacity includes a first oscillator having a first frequency-determining element connectable to the first partial capacity and a second oscillator having a second frequency-determining element connectable to the second partial capacity; a switching means to switch the first frequency-determining element into a first state or to switch it into a second state, and to switch the second frequency-determining element into a third state or to switch it into a fourth state; read apparatus having a first detection means connected to the first oscillator; and an evaluation means which carries out a quotient formation to obtain a value indicating a quotient of the first and the second partial capacity.

20 Claims, 2 Drawing Sheets

APPARATUS AND METHOD FOR READING OUT A DIFFERENTIAL CAPACITY WITH A FIRST AND SECOND PARTIAL CAPACITY

CROSS-REFERENCE TO RELATED APPLICATION

This application is a continuation of copending International Application No. PCT/EP02/01857, filed Feb. 21, 2002, which was designated in the United States and was not published in English.

BACKGROUND OF THE INVENTION

1. Field of the Invention

The present invention relates to reading out capacities and in particular to reading out differential capacities.

2. Description of Prior Art

Today in many apparatuses differential capacities are used as sensitive elements. For example, differential capacities are used as electrical elements on various sensors. Such sensors comprise, for example, acceleration sensors, pressure sensors or path sensors. Today many circuit variations are known for reading out differential capacities, which, however, cannot be employed for specific problems or only with restrictions.

For example, in particular applications it is required to detect a relatively slow change in capacity with high resolution. At the same time, however, changes in capacity occurring for a short time must be recognized within a very short period of time during readout. Such requirements occur, for example, when a single sensor having an acceleration-dependent differential capacity is employed for traction control of a motor vehicle and is to serve as an airbag sensor at the same time. Such a sensor should be capable of recognizing a crash within a period of time that permits the release of an airbag before the passengers in the motor vehicle can be harmed on the one hand. At the same time, such a sensor should be capable of detecting the acceleration data that are significantly lower compared to the accelerations occurring in a crash with high accuracy to permit secure traction control.

Another example in which a sensor is to meet the requirements of both detecting slow changes in capacity with high accuracy and recognizing very fast changes includes the manipulation of heavy weights. Often, in particular applications such as demolition of houses, in which a crane controls the movement of an iron ball, a control of weights is carried out as a function of acceleration signals provided by a sensor fastened to the heavy weight. On the one hand, for such an application the very slow movement of the large mass should be detected by the sensor with high resolution in order to perform an exact maneuvering in a particular position. On the other hand, changes in acceleration by means of impacts which may occur when a large mass impinges on the wall of a house, for example, and which may be as strong as several 100.000 g should be recognized, the demands on such a sensor being significantly higher due to the high change in acceleration within a very short time interval than for the above-described case of a sensor intended to serve as traction control and simultaneously as an airbag sensor.

For the above-described requirements of a detection of a slow change in capacity of the differential capacity with a high resolution and the simultaneous recognition of very fast changes in capacity two or more sensors are known to be used, a first known sensor being used to perform the slow change in capacity with high accuracy and a second sensor being used to recognize the fast change in capacity. For reading out, a readout circuit which may be further adapted specifically to the requirements of the sensor is used for each sensor.

A known readout circuit is described in DE 19645028 A1, for example, in which a LC oscillator is used to detect a deflection of a middle plate of a differential capacitor. Using a switchover means, the partial capacities of the differential capacity are alternately switched as frequency-determining capacities into a LC oscillating circuit. The LC oscillating circuit comprises an oscillator transistor operated in a source circuit. The switchover means includes switching diodes, a frequency measurement being shifted by an appropriately selected time window in such a way that a frequency measurement is excluded during a transient state of the oscillator. Subsequently, the frequencies of the two circuits are determined and are provided to another interpretation for obtaining a deflection of the middle plate. The frequency measurement may be determined, for example, by measuring impulses falling into a predetermined time window, the values being averaged above a plurality of oscillation periods. However, the circuitry described above has the disadvantage that a continuous readout with high accuracy is not possible, because readout is not possible during a transient state of the oscillator. In addition to this, a secure readout of fast changes in capacity which occur for a short time during the transient states is thus not possible.

U.S. Pat. No. 4,860,232 discloses a circuit for measuring capacities, a reference capacity and a sensor capacity being connected to a voltage comparison means comparing an input voltage with a reference voltage. A feedback loop is used to generate an offset voltage which is proportional to the difference of the reference capacity and the sensor capacity. However, the use of the voltage comparison means has the disadvantage that complicated calibrations are necessary to compensate charge injections caused by a switchover.

U.S. Pat. No. 5,973,538 describes a sensor circuit in which a first arrangement of CMOS inverters connected in series, which is connected to a first capacitor, and a second arrangement of CMOS inverters connected in series, which is connected to a second capacitor, are used to generate output voltages indicating the capacity value of the first and the second capacitor.

SUMMARY OF THE INVENTION

It is the object of the present invention to provide a concept permitting enhanced readout of a differential capacity.

In accordance with a first aspect, the present invention provides an apparatus for reading out a differential capacity with a first and second partial capacity having a first oscillator having a first frequency-determining element connectable to the first partial capacity; a first oscillator having a first frequency-determining element connectable to the first partial capacity; a second oscillator having a second frequency-determining element connectable to the second partial capacity; a switching means formed to switch the first frequency-determining element into a first state, so that the first oscillator has a first oscillation with a first period duration, or to switch it into a second state, so that the first oscillator has a second oscillation with a second period duration, and wherein the switching means is further formed to switch the second frequency-determining element into a third state, so that the second oscillator has a third oscillation with a third period duration, or to switch it into a fourth state, so that the second oscillator has a fourth oscillation with a fourth period duration; a first detection means connected to the first oscillator to generate a first signal indicating the first period duration and a second signal indicating the second period duration; a second detection means connected to the second oscillator to generate a third signal indicating the third period duration and a fourth signal indicating the fourth period duration; and an evaluation means for forming a quotient, using the first, second, third and fourth signal, whose numerator depends on the first oscillator and whose denominator depends on the second oscillator to obtain a value indicating a quotient of the first and the second partial capacity.

In accordance with a second aspect, the present invention provides a method for reading out a differential capacity with a first and second partial capacity having the following steps: setting a first oscillator having a first frequency-determining element connected to the first partial capacity into a first oscillation having a first period duration by switching the first frequency-determining element into a first state; generating a first signal indicating the first period duration; setting the first oscillator into a second oscillation having a second period duration by switching the first frequency-determining element into a second state; generating a second signal indicating the second period duration; setting a second oscillator having a second frequency-determining element connected to the second partial capacity into a third oscillation having a third period duration by switching the second frequency-determining element into a third state; generating a third signal indicating the third period duration; setting the second oscillator into a fourth oscillation having a fourth period duration by switching the second frequency-determining element into a fourth state; generating a fourth signal indicating a fourth period duration; forming a quotient, using the first to fourth signal, whose numerator depends on the first oscillator and whose denominator depends on the second oscillator to obtain a value indicating a quotient of the first and the second partial capacity.

According to the present invention a first oscillator is provided for a first of the two partial capacities and a second oscillator is provided for a second partial capacity, the oscillators being connected to the associated partial capacities in operation. Each of the oscillators is operable in two states by a switchover of frequency-determining elements. In correspondence with the state in which the frequency-determining element of the oscillator is, the first oscillator generates a first or a second oscillation and the second oscillator generates a third or fourth oscillation. During a subsequent evaluation in an evaluation circuit, an input signal is formed using the detected period durations, which indicates a quotient of the first and the second partial capacity.

The present invention is based on the finding that the detection of the period durations for each of the two oscillatory states of each oscillator, which is connected to a partial capacity and permits the quotient formation using the period durations, that unknown spurious influences which otherwise prevent an accurate readout of the partial capacities can be eliminated, so that the output signal indicating a quotient of the partial capacities can be formed with high accuracy.

The forming of the quotient using the detected period durations occurs in a preferred embodiment such that the numerator of the quotient has a value indicating a difference of a first period duration of the first oscillation of the first oscillator and a second period duration of the second oscillation of the first oscillator, while the denominator has a value indicating a difference of a third period duration of the third oscillation of the second oscillator and a fourth period duration of the fourth oscillation of the second oscillator.

One advantage of the present invention is that if the frequency-determining elements are suitably selected so that the values thereof are within the same order of magnitude a continuous detection can be carried out, because for each oscillator the switchover of the states of the frequency-determining elements can be carried out at the same time as the beginning of a detection of the oscillation, i.e. without waiting for a transient state to be finished.

In a preferred embodiment the switchover of the states for the first oscillator occurs at the same time as the switchover for the second oscillator and in constant time intervals, whereby a simplification of a subsequent evaluation is achieved.

In a preferred embodiment the period durations of the oscillations are determined by detecting a number of clock periods in a first detection means connected to the first oscillator and in a second detection means connected to the second oscillator. In this embodiment, both slow changes in capacity can be detected with high accuracy and at the same time short-term high changes in capacity can be recognized by the readout means. In order to do so, within a detection time interval within which the first and second oscillator each has an oscillatory state, a first number of clock periods of the first detection means detected at the respective predetermined times is compared at predetermined times with a second number of clock periods of the second detection means detected at this time, the result of this comparison being compared with a limiting value. Comparing the number of clock periods in shorter time intervals that can be chosen at will permits that short-term great changes of the first and the second partial capacity can be recognized, while at the same time a slow change of the partial capacities can be carried out with high accuracy by determining the number of clock periods over the long-term detection time interval.

BRIEF DESCRIPTION OF THE DRAWINGS

These and other objects and features of the present invention will become clear from the following description taken in conjunction with the accompanying drawings in which.

DESCRIPTION OF THE PREFERRED EMBODIMENTS

Figure 1:
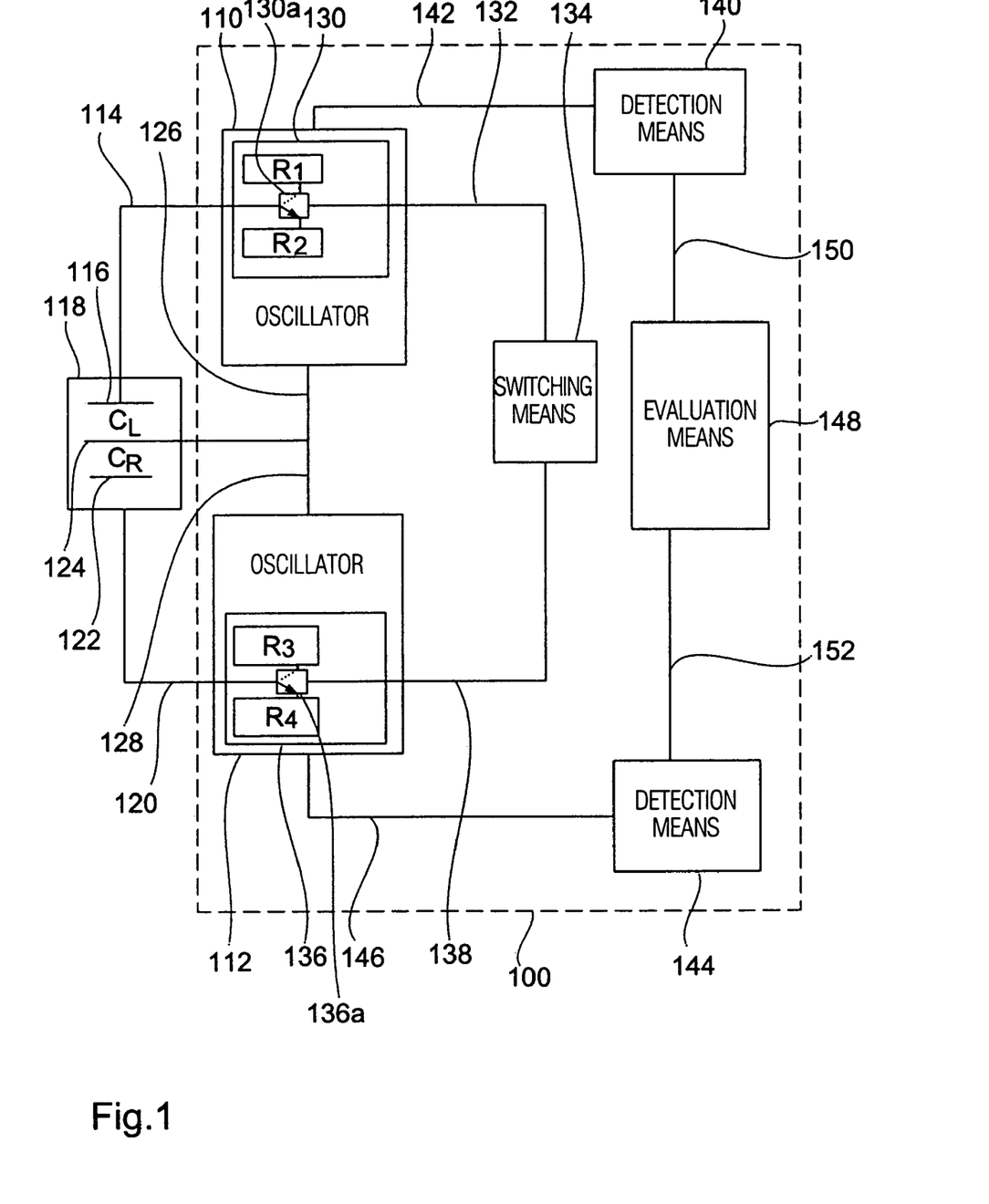
FIG. 1 is a block diagram of an embodiment of the present invention.

Referring to FIG. 1 a readout apparatus 100 is shown as a first embodiment of the present invention. The readout apparatus 100 comprises a first oscillator 110 and a second oscillator 112, the first oscillator 110 being connectable to a first fixed electrode 116 of a differential capacity 118 via a line 114, while the second oscillator 112 is connectable to a second fixed electrode 122 via a line 120. In one embodiment the first oscillator 110 and the second oscillator 112 each comprise a square-wave oscillator formed by a CMOS circuit.

The differential capacity 118 comprises a moveable electrode 124 connectable to the first oscillator 110 via a line 126 and to the second oscillator 112 via a line 128. The differential capacity 118 includes any known type, for example a semiconductor differential capacitor, which is formed by means of known etching and masking steps in a semiconductor substrate. For example, the differential capacity 118 includes a sensitive element of a capacitive sensor, which may be, for example, an acceleration sensor, a pressure sensor or a path sensor.

The first oscillator 110 comprises a first frequency-determining element 130 connectable to electrode 116 via line 114. The first oscillator 110 is further connected to a switching means 134 via a line 132 to switch the frequency-determining element 130 into a first state or into a second state. In the embodiment described, the first frequency-determining element 130 has a first resistor R1 and a second resistor R2, each connectable to line 114 via a switch 130a. In the first state of the frequency-determining element 130, the first resistor R1 is connected to line 114, whereas in the second state the second resistor R2 is connected to line 114.

The second oscillator 112 comprises a second frequency-determining element 136, the second frequency-determining element being connectable to the fixed electrode 122 of the differential capacity 118 via line 120. The second oscillator 112 is further connected to switching means 134 via a line 138 to carry out from switching means 134 a switching signal for switching the second frequency-determining element 136 into a third state or a fourth state. In the embodiment described, the second frequency-determining element 136 includes a third resistor R3 connected to line 120 in the third state and a fourth resistor R4 connected to line 120 in the fourth state, the resistors R3 and R4 being connected by means of a switch 136a in response to a signal of switching means 134.

Readout means 100 further includes a first detection means 140 connected to the first oscillator 110 via a line 142. The first detection means 140 is formed to detect a period duration of an oscillation generated by the first oscillator. Readout means 100 further includes a second detection means 144 for detecting a period duration of an oscillation generated by the second oscillator 112, the second detection means 144 being connected to the second oscillator 112 via a line 146. The detection means 140 and 144 may include any known means for detecting period durations. In one embodiment, which will be explained in greater detail below, the detection means 140 and 144 have counters detecting a number of clock periods of the oscillations within a particular time interval.

An evaluation means 148 is further connected to the first detection means 140 via a line 150, while it is connected to the second detection means 144 via a line 152.

In order to carry out a readout process, switching means 134 applies a switching signal to the first oscillator 110 via line 132, so that the first R1 or the second R2 resistor is connected to electrode 116. Furthermore, switching means 134 applies switching signals to the second oscillator 112 via line 138, which cause a connection of the third R3 or fourth R4 resistor to electrode 122.

During operation of the readout means in the oscillator circuit formed by the oscillator together with the frequency-determining element and the partial capacity, depending on the switched state of the frequency-determining elements the first oscillator 110 and the second oscillator 112 generate a first or second or a third or fourth oscillation, respectively, a clock period of the oscillations depending on a charging time $\tau$ of the partial capacity C with which the oscillator is respectively connected. According to the known formula $\tau = R \cdot C$, charging time $\tau$ depends on both the resistance R of the resistor with which the partial capacity C is connected and on the partial capacity C itself.

In addition to the dependency on the charging time of a respective partial capacity, a period duration of the oscillators 110 and 112 is influenced by a charging time $\tau_{OSC}$ which does not depend on the partial capacity C and the frequency-determining elements but on further devices of the oscillators 110, 112, respectively. A period duration T of a respective oscillator thus results to be: $T = R \cdot C + \tau_{OSC}$. Charging time $\tau_{OSC}$ is typically unknown and is not constant in time due to various noise influences on the oscillators 110 and 112. This prevents that by simply detecting a period duration of a single oscillation of an oscillator, as is carried out in prior art, partial capacities can be read out with high accuracy.

Using an operation of readout means 100, it is hereinafter explained how an improved readout is achieved compared to prior art by using two oscillators 110 and 112 according to the invention.

Applying a first switching signal to the first oscillator 110 causes the first frequency-determining element to be switched into the first state, i.e. the first resistor R1 is connected to line 114 in response to the first switching signal. Correspondingly, the second frequency-determining element 136 of the second oscillator 112 is switched into the third state by a switching signal of switching means 134 transmitted via line 138, i.e. the third resistor R3 is connected to partial capacity $C_R$, which is determined by electrodes 124 and 122, by means of switch 136a. Preferably, the switchover of the switching state of the first 110 and the second 112 oscillator by the switching of the respective frequency-determining elements occurs simultaneously in order to achieve that the period durations of the first oscillator 110 and the period durations of the second oscillator 112 can be detected over the same period of time. The simultaneous detection ensures an exact result in a subsequent quotient formation, as will be explained in greater detail further below.

After the simultaneous switchover of the first oscillator 110 into the first state and of the second oscillator 112 into the third state at a first switchover time, the first oscillator 110 generates the first oscillation with a clock period $T_{L1}$ and the second oscillator 112 generates the third oscillation the clock period $T_{R1}$. According to the above stated facts, the following applies to the clock period $T_{L1}$: $T_{L1} = R_{L1} C_L + \tau_{OSC,L1}$. In the equation $R_{L1}$ is the resistance of resistor R1 and $\tau_{OSC,L1}$ is the additional term describing the charging times by the further devices of the first oscillator. Accordingly, the following applies to the clock period $T_{R1}$ of the third oscillation of the second oscillator: $T_{R1} = R_{R2} C_R + \tau_{OSC,R1}$. Here, $R_{R2}$ is the resistance of resistor R3 and $\tau_{OSC,R1}$ is the additional term describing the charging times by the further devices of the second oscillator in the third state.

Oscillators 110 and 112 generate the first or the third oscillation, respectively, continuously in the course of a first detection time interval having a predetermined length, the initial time of the first detection time interval corresponding to the first switchover time and the end time of the first detection time interval corresponding to a second switchover time at which the frequency-determining element 130 of the first oscillator is switched into the second state and the second frequency-determining element 136 of the second oscillator 112 is switched into the fourth state. While the first frequency-determining element is in the first state, the first detection means 140 detects the period duration of the oscillation generating by the first oscillator 110 and provides a first signal indicating a period duration of the first oscillation to evaluation means 148. Accordingly, while the second frequency-determining element 136 is switched in the third state, the second detection means 144 detects the period duration of the third oscillation generated by the second oscillator 112 and provides a third signal indicating a period duration of the third oscillation to evaluation means 148.

At the end of the first detection time interval, i.e. at the second switchover time, the first frequency-determining element 130 of the first oscillator is switched into the second state and the second frequency-determining element 136 of the second oscillator 112 is switched into the fourth state, so that after the switchover oscillators 110 and 112 generate the second or fourth oscillation, respectively. The period duration $T_{L2}$ of the second oscillation results to be $T_{L2}=R_{L2}C_L+\tau_{OSC,L2}\cdot\tau_{OSC,L2}$, $\tau_{OSC,L2}$ describing the charging times by the further devices of the first oscillator when the first frequency-determining element 130 is in the second state, and $R_{L2}$ being the resistance of the second resistor R2. Correspondingly, the following applies to a clock period $T_{R2}$ of the fourth oscillation of the second oscillator: $T_{R2}=R_{R2}C_R+\tau_{OSC,R2}\cdot\tau_{OSC,R2}$. Here, $\tau_{OSC,R2}$ denotes the charging times by the further devices of the second oscillator when the second frequency-determining element 136 is in the fourth state. Furthermore, $R_{R2}$ corresponds to the resistance of resistor R4.

Oscillators 110 and 112 generate the second or fourth oscillation, respectively, continuously in the course of the second detection time interval which preferably has the same length as the first detection time interval to facilitate a subsequent evaluation. The second detection time interval thus has an initial time corresponding to the second switchover time and further has an end time corresponding to the third switchover time at which the first frequency-determining element 130 of the first oscillator is switched from the second state back into the first state and the second frequency-determining element 136 of the second oscillator 112 is switched from the fourth state back into the third state. While the first frequency-determining element 130 within the second time detection interval is in the second state, the first detection means 140 detects the period duration of the oscillation generated by the first oscillator 110 and provides a second signal indicating a period duration of the second oscillation to evaluation means 148. Accordingly, while the second frequency-determining element 136 is switched in the fourth state, the second detection means 144 detects the period duration of the fourth oscillation generated by the second oscillator 112 and provides a signal indicating a period duration of the fourth oscillation to evaluation means 148.

Consequently, two oscillations, each having different period durations, are generated per oscillator and, furthermore, four signals, each indicating one of the period durations of the oscillations, are provided to the evaluation means by the detection means 140 and 144.

In one embodiment, the first detection means 140 and the second detection means 144 each includes a counting means detecting the number of clock periods of the generated oscillations occurring in the first or second detection time interval, respectively. Referring to the detection of a number of clock periods, an evaluation for the generation of an output signal indicating a quotient of the partial capacities is explained hereinafter.

In this embodiment, by the detection during the first or second detection time interval, respectively, a time averaging of the period durations of the clock periods occurring during the detection time window is carried out. As will be explained in greater detail hereinafter, for a readout with high accuracy it is necessary to suitably choose the time length of the detection time intervals and the order of magnitude of the clock frequency of the oscillators which is determined by the partial capacities and the frequency-determining elements in order to average out statistical noise components over the period of time.

The first detection means 140 and the second detection means 144 detect at each oscillator the number of clocks N during the first and second detection time intervals each preferably having a same predetermined time length $T_S$. The number of clocks N is a measured value which is inversely proportional to the period duration of the oscillation. As is described above, the frequency-determining elements 130 and 136 are switched at the beginning of a detection time interval. The first detection means 140 outputs a first and a second detection signal. The first detection signal indicates a first number $N_{L1}$ of clock periods of the first oscillator 110 in the first state occurring within the first detection time interval. Furthermore, the second detection signal indicates a second number $N_{L2}$ of clock periods of the first oscillator in the second state occurring within the second detection time interval, the first and second detection time interval each including time period $T_S$. Taking the dependency of period duration T according to $T=RC+\tau_{OSC}$ into account, the number $N_{L1}$ or $N_{L2}$, respectively, results to be:

$$N_{L1} = \frac{T_S}{R_{L1} \cdot C_L + \tau_{osc,L1}} \quad N_{L2} = \frac{T_S}{R_{L2} \cdot C_L + \tau_{osc,L2}}$$

Correspondingly, the second detection means 144 outputs a third detection signal indicating a third number $N_{R1}$ of clocks of the second oscillator in the third state of the frequency-determining element, whereas a fourth output signal of the second detection means 144 indicates a fourth number $N_{R4}$ of clocks during the time interval within which the second frequency-determining element is switched in the fourth state. According to the following formulae, the number $N_{R1}$ or $N_{R2}$, respectively, results to be:

$$N_{R1} = \frac{T_S}{R_{R1} \cdot C_R + \tau_{osc,R1}} \quad N_{R2} = \frac{T_S}{R_{R2} \cdot C_R + \tau_{osc,R2}}$$

The first to fourth detection signals are input into evaluation means 148 via lines 150 or 152, respectively. Preferably, the first detection means 140 and the second detection means 144 are formed in such a manner that the output signals are input into evaluation means 148 as data words. Then evaluation means 148 carries out a calculation operation during which a quotient is formed, the numerator depending on the clock numbers $N_{L1}$ and $N_{L2}$ of the first oscillator, whereas the denominator of the quotient depends on the clock numbers $N_{R1}$ and $N_{R2}$ of the second oscillator. In the embodiment described, the quotient is calculated according to the following formula:

$$\frac{\frac{1}{N_{L1}} - \frac{1}{N_{L2}}}{\frac{1}{N_{R1}} - \frac{1}{N_{R2}}} = \frac{\frac{R_{L1} \cdot C_L + \tau_{osc,L1}}{T_S} - \frac{R_{L2} \cdot C_L + \tau_{osc,L2}}{T_S}}{\frac{R_{R1} \cdot C_R + \tau_{osc,R1}}{T_S} - \frac{R_{R2} \cdot C_R + \tau_{osc,R2}}{T_S}} =$$

-continued $$\frac{(R_{L1} - R_{L2}) \cdot C_L + (\tau_{osc,L1} - \tau_{osc,L2})}{(R_{R1} - R_{R2}) \cdot C_R + (\tau_{osc,R1} - \tau_{osc,R2})}$$

The above quotient formation permits that by transforming the quotient in the right hand quotient expression of the above equation it is achieved that the undesirable impacts on the period durations described by the terms $\tau_{OSC,L1}$ $\tau_{OSC,L2}$ and $\tau_{OSC,R1}$ $\tau_{OSC,R2}$ only occur as difference terms $\tau_{OSC,L1} - \tau_{OSC,L2}$ or $\tau_{OSC,R1} - \tau_{OSC,R2}$, respectively. This means that the impacts of the undesirable period durations $\tau_{OSC,L1}$ $\tau_{OSC,L2}$ and $\tau_{OSC,R1}$ $\tau_{OSC,R2}$ which are not determined by the partial capacities and the frequency-determining elements can be significantly reduced or eliminated with regard to the quotient formation, if the condition is met that these impacts are approximately equal for both oscillation states of respectively one oscillator.

In other words, the following has to be demanded:

$$\tau_{OSC,v1} \approx \tau_{OSC,v2}$$

wherein v=L has to be set for the first oscillator 110 and v=R for the second oscillator 112.

This optimization condition is met the better the faster the switching of the states occurs, i.e. the more short-term the detection time intervals are, because the operation conditions of the oscillators do not significantly change during two states that follow each other quickly.

On the other hand, it is desirable to determine the order of magnitude of the clock frequency of the oscillators and the length of the detection time intervals or sample phases, respectively, in such a way that the statistical noise components over this period of time are averaged out. Noise elimination is the better the greater the length of the detection time intervals is.

When optimizing these opposing behaviors it has to be taken into consideration that non-statistical noise components, such as a 1/f noise of transistors of oscillators 110 and 112, exert an influence on the terms $\tau_{OSC,L1}$, $\tau_{OSC,L2}$, $\tau_{OSC,R1}$ and $\tau_{OSC,R2}$, so that $T_S$ has to be chosen so low that these non-statistical noise components are minimized to achieve the corresponding approximate equality $$\tau_{OSC,v1} \approx \tau_{OSC,v2}.$$

Under the above assumption the difference terms $\tau_{OSC,L1} - \tau_{OSC,L2}$ and $\tau_{OSC,R1} - \tau_{OSC,R2}$, respectively, become approximately zero and the above quotient results to be:

$$\frac{R_{L1} - R_{L2}}{R_{R1} - R_{R2}} \cdot \frac{C_L}{C_R} = k \cdot \frac{C_L}{C_R}$$

The result shows that by means of the optimization described above the quotient formation carried out by evaluation means 148 provides a result whose value is proportional to the quotient of $C_1$ and $C_2$. The occurring proportionality factor k is formed by the quotient whose numerator includes a difference of the first and second resistor, whereas the denominator thereof includes a difference of the third and fourth resistor. As has already been mentioned above, spurious effects by devices of the first 110 or the second 112 oscillator, respectively, are eliminated in the above quotient. Consequently, with the above optimization by the quotient formation it can be achieved that the ratio of the partial capacities $C_L$ and $C_R$ is detected with high accuracy.

For a further processing, which may be controlling of an object, for example, evaluation means 148 applies an output signal indicating the calculated quotient to an output to provide the signal, for example, to a control means for controlling an object whose movement is detected by differential capacity 118 by means of changes in the partial capacities. Advantageously, the entire logic with which most of the evaluation algorithm is realized is a digital logic, so that the output signal is advantageously provided as a digital signal, as well, which permits further processing in a digital control means without much effort.

Typical values for the resistors R1–R4 are greater than 10 kΩ in one range. In one embodiment, the first resistor R1 includes a value of 80 kΩ, the second resistor a value of 40 kΩ, the third resistor a value of 45 kΩ and the fourth resistor R4 a resistance of 90 kΩ if the value of the first and second partial capacity is in a range below 1 pF. With regard to the choice of the resistors, it has to be noted that they advantageously include the same order of magnitude to prevent a long transient of the oscillators during a switchover. With the above resistances a value results for the proportionality factor k, which is close to 1, i.e. in a range from 0.85 to 1.15. This value of 1 is preferred, because here possible undesirable impacts of the resistors, e.g. temperature impacts, compensate each other.

In this embodiment, the clock frequencies are typically selected in such a way that they are greater than one MHz for a non-deflected state of moveable electrode 124. In these clock frequencies, the length of the detection time intervals with regard to the optimization described above is advantageously selected in a range from 100 to 10,000 clock periods, and, particularly preferably, in a range from 500 to 1,500 clock periods, whereby the detection time period $T_S$ approximately has a range from 0.1 ms to 10 ms.

Figure 2:
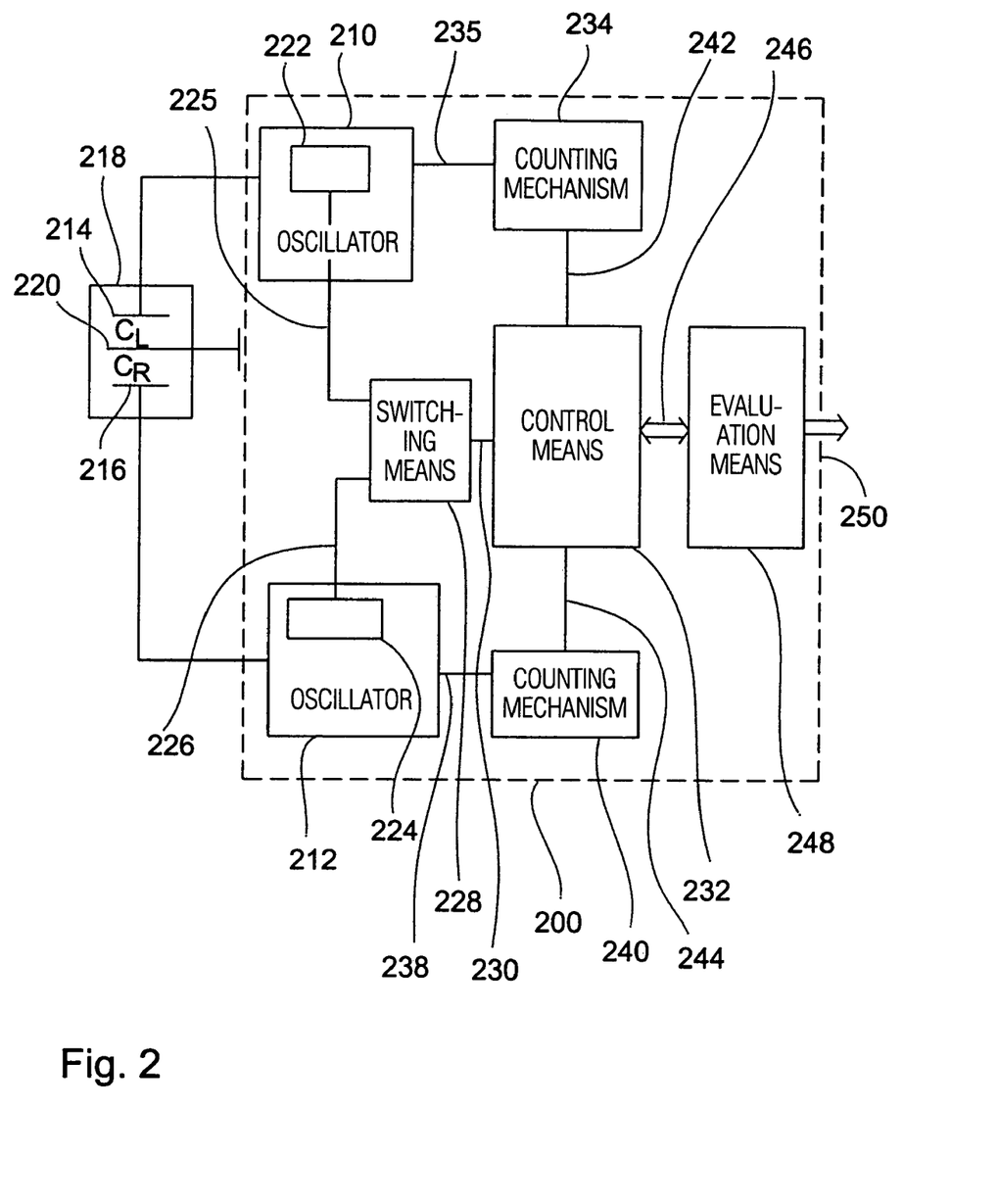
FIG. 2 is a block diagram of another embodiment of the present invention.

Referring to FIG. 2 a further embodiment will hereinafter be explained as a development of the embodiment in FIG. 1. According to FIG. 2 a readout means 200 includes a first oscillator 210 and a second oscillator 212. Oscillators 210 and 212 are each connected to a fixed electrode 214 or 216, respectively, of a differential capacity 218. Furthermore, a moveable electrode 220 of the differential capacity 218 is connected to both the first oscillator 210 and to the second oscillator 212 via ground. In correspondence to the embodiment of FIG. 1, oscillator 210 comprises a first frequency-determining element 222 and the second oscillator 212 comprises a second frequency-determining element 224. The first oscillator 210 and the second oscillator 212 are each connected to a switching means 228 via lines 225, 226, respectively. Switching means 228 is further connected to a control means 232 via a line 230. The first oscillator 210 is connected via a line 236 to a first counting mechanism 234 for detecting period durations of the first oscillator 210. The second oscillator 212 is also connected via a line 238 to a second counting mechanism 240 for detecting period durations of the second oscillator 212.

The first counting mechanism 234 and the second counting mechanism 240 are further connected to control means 232 via lines 242 or 244, respectively. Control means 232 is connected to an evaluation means 248 via a signal line 246. Evaluation means 248 has an output 250 connectable to further processing and control means via signal lines 252. In correspondence to the embodiment in FIG. 1, for reading out the first partial capacity $C_L$ formed between electrode 214 and 220 and the second partial capacity $C_R$ formed between electrodes 216 the first frequency-determining element 222 is switched into a first state in a first detection time interval and is switched into a second state in a second detection time interval. Correspondingly, the second frequency-determining element 224 is switched into a third state in the first detection time interval and is switched into a fourth state in the second detection time interval. The first detection time interval extends from a first time to a second time, whereas the second detection time interval extends from the second time to a third time.

Control means 232 controls counting mechanism 234 via a control signal applied thereto in such a way that a count value for detecting clock periods of oscillations of the first oscillator 210 is reset to a predetermined initial value to carry out a detection of a number of clock periods occurring in the time interval within which the first frequency-determining element has the first state. The second counting mechanism 240 is also reset to a predetermined value at the first time to carry out a continuous detection of a number of clock periods of an oscillation of the second oscillator 212 during the time interval within which the second frequency-determining element 224 has the third state. The continuous detection by the counting mechanisms 234 or 240, respectively, means that their count value is set forward by a particular value, i.e. by a unit, for example, with every clock occurring. The first counting mechanism 234 and the second counting mechanism 240 are reset back to the initial value at the second time, so that the first counting mechanism 234 detects the clock pulses of the first oscillator 210 during a second detection time interval within which the first frequency-determining element 222 is in the first state and the second frequency-determining element 224 is in the third state, whereas the second counting mechanism 240 detects the clock periods of the second oscillator 212 during the second detection time interval. A switchover of the first frequency-determining element 222 into the second state and a switchover of the second frequency-determining element 224 into the fourth state are then carried out at the third time. Advantageously, the first time interval and the second time interval have the same length, which facilitates both the control of frequency-determining elements 222 and 224 and of detection means 234 and 240 and a calculation in evaluation means 248. As has already been explained with reference to the embodiment in FIG. 1, for achieving a readout with high accuracy the length of the first and second detection time interval is advantageously selected such that statistical and non-statistical noise components are minimized. In contrast to the embodiment in FIG. 1, in this embodiment a detection of a temporal change of a current period duration is carried out to output a signal indicating an exceeding of a predetermined value in response to a comparison of a temporal change of a current period duration of the first, second, third or fourth oscillation with a predetermined value. The detection of the temporal change can be carried out either by detecting only a current period duration of an oscillation, i.e. either of the first, second, third or fourth oscillation, and comparing the detected value with a comparison value or by detecting the period durations of current oscillations of the first 110 and the second 112 oscillator, as will be explained hereinafter.

For this purpose, in this embodiment the number of clock periods of the first oscillator detected by the first counting mechanism 234 is compared with the number of clock periods of the second oscillator detected in the second counting mechanism 240 at predetermined comparison times. This is made possible, because the detection by the counting mechanisms 234 and 240 is continuous. The comparison of the counter values of the first counting mechanism 234 and of the second counting mechanism 240 is controlled by control means 232 and permits that fast changes in the first and second partial capacity occurring for a short time can be recognized quickly, as will be explained hereinafter.

A short-term high change in capacity causes the values of the partial capacities to differ greatly for a short time. Due to the great differences in capacity, the oscillators provide oscillations having period durations which differ greatly with respect to their difference compared to values before the occurrence of the short-time high change in capacity. This can be utilized, because in a continuous detection of the clock periods highly different differences of the count values of the first counting mechanism and of the second counting mechanism result for the short period of the high differences in capacity of the partial capacities. The temporal range in which such a change can be detected depends on a choice of the comparison times.

The temporal distance of the comparison times can be set by an external or internal clock signal, for example, so that after a particular number of clock cycles of the external or internal clock signal the number of detected clock periods of the first counting mechanism 234 and of the second counting mechanism 240 are compared. The temporal distances of the comparison times can be chosen at will, and it is preferable to choose them in such a way that the typical peaks of a change in capacity occurring in the intended application are securely recognized.

In one embodiment, the comparison times are alternatively determined by the clock periods of the first oscillator 210 or second oscillator 212, respectively, detected by the first counting mechanism 234 and the second counting mechanism 240. The comparison time results when either the first counting mechanism 234 or the second counting mechanism 240 reaches a predetermined number of clock periods which have been detected since the last comparison time. For example, the comparison time is set when five clock periods were detected in the first counting mechanism 234 or in the second counting mechanism 240 since the previous comparison time.

The comparison of the count values of the first counting mechanism 234 and of the second counting mechanism 240 carried out at the comparison times provides a difference of the two count values and allows short-term fast changes in capacity of the partial capacities to be recognized by comparing with a predetermined limit value. The predetermined limit value can, for example, be determined by a testing in which the peaks of capacity change occurring for a respective application are detected. By comparing the difference of the count value of the first counting mechanism 234 with the second counting mechanism 240, a decision procedure can be carried out, in which a signal indicating the occurrence of a short-term high change in capacity when an amount of the difference of the count value of the first counting mechanism 234 and of the second counting mechanism 240 is greater than the predetermined limit value.

Readout means 200 further permits that a change in capacity can be detected continuously with high accuracy by determining four values indicating the period durations of the first oscillator 210 and of the second oscillator 212 in the respective states of the first frequency-determining element 222 and of the second frequency-determining element across the first and second detection time interval in correspondence with the method described with reference to the embodiment in FIG. 1. By the quotient formation described with reference to the embodiment of FIG. 1, an output signal indicating the quotient of the first and second partial capacity is applied to output 250 by evaluation means 248 using the four values. At the same time, however, read out means 200 is capable of carrying out a recognition of short-term high changes in capacity by comparing the amount of difference of the count value of the first counting mechanism 234 and of the count value of the second counting mechanism 240 with a predetermined limit value at the comparison times.

Although the first and second frequency-determining element each comprises two resistors in the present embodiments, in other embodiments the first and second frequency-determining element may each comprise two inductances, the switching means being further formed to carry out a switchover of the inductances for switching the states of the frequency-determining elements.

Advantageously, readout means 100 or 200, respectively, are provided as integrated circuits on a chip, and the chip may additionally include the differential capacity. This makes a compact sensor possible in which both the capacitive sensitive element and the read out/evaluation means are arranged on a chip. Advantageously, the first and second detection means, the switching means and the evaluation means include digital devices to permit an as much as possible digital processing on the chip without an external wiring.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for reading out a differential capacity with a first and second partial capacity comprising:
    a first oscillator having a first frequency-determining element connectable to the first partial capacity;
    a second oscillator having a second frequency-determining element connectable to the second partial capacity;
    a switching means formed to switch the first frequency-determining element into a first state, so that the first oscillator has a first oscillation with a first period duration, or to switch it into a second state, so that the first oscillator has a second oscillation with a second period duration, and wherein the switching means is further formed to switch the second frequency-determining element into a third state, so that the second oscillator has a third oscillation with a third period duration, or to switch it into a fourth state, so that the second oscillator has a fourth oscillation with a fourth period duration;
    a first detection means connected to the first oscillator to generate a first signal indicating the first period duration and a second signal indicating the second period duration;
    a second detection means connected to the second oscillator to generate a third signal indicating the third period duration and a fourth signal indicating the fourth period duration; and
    an evaluation means for forming a quotient using the first, second, third and fourth signal, whose numerator depends on the first oscillator and whose denominator depends on the second oscillator to obtain a value indicating a quotient of the first and the second partial capacity.

2. The apparatus according to claim 1, wherein the first detection means is formed to generate a first signal indicating a first number of clock periods of the first oscillation in a first detection time interval and a second signal indicating a second number of clock periods of the second oscillation in a second detection time interval, and wherein the second detection means is formed to generate a third signal indicating a third number of clock periods of the third oscillation in the first detection time interval and a fourth signal indicating a fourth number of clock periods of the fourth oscillation in the second detection time interval, wherein the second detection time interval starts at the end of the first detection time interval.

3. The apparatus according to claim 2, wherein the numerator of the quotient has a difference of a reciprocal of the first number of clock periods and of a reciprocal of the second number of clock periods, and wherein the denominator of the quotient has a difference of a reciprocal of the third number of clock periods and of a reciprocal of the fourth number of clock periods.

4. The apparatus according to claim 2, wherein the first, second, third and fourth numbers of clock periods include a range from 1,000 to 100,000 and advantageously a range from 1,500 to 60,000.

5. The apparatus according to claim 2, wherein the first and second detection time interval includes a range from 1.5 ms to 100 ms.

6. The apparatus according to claim 1, wherein the first frequency-determining element is formed to have an electric resistance defined by a first resistor in the first state and defined by a second resistor in the second state, and wherein furthermore the second frequency-determining element is formed to have an electric resistance defined by a third resistor in the third state and defined by a fourth resistor in the fourth state.

7. The apparatus according to claim 6, wherein the first, second, third and fourth resistors have a resistance greater than 10 kΩ.

8. The apparatus according to claim 6, wherein the first, second, third and fourth resistors are selected such that a quotient with a numerator including a difference of the first and second resistor, and a denominator including a difference of the third and fourth resistor comprises an amount which is in a range from 0.95 to 1.05.

9. The apparatus according to claim 1, which further comprises an apparatus for detecting a temporal change of a current period duration of the first, second, third or fourth oscillation.

10. The apparatus according to claim 9, wherein the apparatus for detecting a temporal change of a current period duration comprises a means which is formed to output, in response to a comparison of a temporal change of a current period, duration of the first, second, third or fourth oscillation with a predetermined value, a signal indicating an exceeding of the predetermined value.

11. The apparatus according to claim 9, wherein the apparatus for detecting a temporal change of a current period duration comprises:
    an apparatus for comparing a first detection state of the first detection means with a second detection state of the second detection means at a predetermined time which is within the first or second detection time interval which comprise an initial time and an end time, wherein the first state of the first detection means indicates a first comparison number which denotes a number of clock periods of the first oscillator occurring from the initial time to the predetermined time, and wherein the second detection state of the second detection means indicates a second comparison number of clock periods of the second oscillator which denotes a number of clock periods of the second oscillator occurring from the initial time to the predetermined time, and wherein the apparatus for comparing a first detection state is further formed to carry out a comparison with a predetermined limit value in response to the comparison of the first state of the first detection means with the second state of the second detection means, to generate, in response to the comparison, an output signal indicating an exceeding of the predetermined limit value.

12. The apparatus according to claim 1, wherein the numerator of the quotient has a value indicating a difference of the first and second period duration and the denominator has a value indicating a difference of the third and fourth period duration.

13. The apparatus according to claim 1, wherein the first, second, third and fourth period durations include a range from 0.1 to 1 µs.

14. The apparatus according to claim 1, wherein the first frequency-determining element has a first and second inductance and the second frequency-determining element has a third and fourth inductance.

15. The apparatus according to claim 1, wherein the first oscillator and the second oscillator have a CMOS circuit.

16. The apparatus according to claims 1, wherein the apparatus includes an integrated circuit arranged on a semiconductor chip.

17. A method for reading out a differential capacity with a first and second partial capacity comprising the following steps:

setting a first oscillator having a first frequency-determining element connected to the first partial capacity into a first oscillation having a first period duration by switching the first frequency-determining element into a first state;

generating a first signal indicating the first period duration;

setting the first oscillator into a second oscillation having a second period duration by switching the first frequency-determining element into a second state;

generating a second signal indicating the second period duration;

setting a second oscillator having a second frequency-determining element connected to the second partial capacity into a third oscillation having a third period duration by switching the second frequency-determining element into a third state;

generating a third signal indicating the third period duration;

setting the second oscillator into a fourth oscillation having a fourth period duration by switching the second frequency-determining element into a fourth state;

generating a fourth signal indicating a fourth period duration;

forming a quotient, using the first to fourth signal, whose numerator depends on the first oscillator and whose denominator depends on the second oscillator to obtain a value indicating a quotient of the first and the second partial capacity.

18. The method according to claim 17, wherein in the step of generating a first signal a detection of a first number of clock periods of the first oscillation in a first detection time interval, in the step of generating a second signal a detection of a second number of clock periods of the second oscillation in a second detection time interval, in the step of generating a third signal a detection of a third number of clock periods of the third oscillation in the first detection time interval and in the step of generating a fourth signal a detection of a fourth number of clock periods of the fourth oscillation in the second detection time interval is further carried out, wherein the second detection time interval starts at the end of the first detection time interval.

19. The method according to claim 18, wherein in the steps of generating a first and second signal a continuous detection of a number of clock periods of the first or second oscillation is further carried out to provide a first current detection state, and wherein in the step of generating a third and fourth signal a continuous detection of a number of clock periods of the third or fourth oscillation is carried out to provide a second current detection state.

20. The method according to claim 19, further comprising the following steps:

comparing the first current detection state with the second current detection state at a predetermined time which is within the first or second detection time interval to provide a comparison value indicating a difference of the first current detection state and of the second current detection state; and comparing the comparison value with a predetermined limit value to provide a comparison output signal indicating an exceeding of the limit value with regard to the predetermined limit value.

* * * * *